Oct. 7, 1947. L. J. RASERO Re. 22,925

LADDER-TAPE

Original Filed Sept. 9, 1946 3 Sheets-Sheet 1

Inventor
Lawrence J. Rasero
By
Seymour Earle & Nichols
Attorneys

Oct. 7, 1947. L. J. RASERO Re. 22,925

LADDER-TAPE

Original Filed Sept. 9, 1946 3 Sheets-Sheet 2

Inventor
By Lawrence J. Rasero
Seymour Earle Nichols
Attorneys

Oct. 7, 1947. L. J. RASERO Re. 22,925

LADDER-TAPE

Original Filed Sept. 9, 1946 3 Sheets-Sheet 3

Inventor
Lawrence J. Rasero
By Seymour Earle Nichols
Attorneys

Reissued Oct. 7, 1947

Re. 22,925

UNITED STATES PATENT OFFICE 22,925

LADDER TAPE

Lawrence J. Rasero, Middletown, Conn., assignor to The Russell Manufacturing Company, Middletown, Conn., a corporation of Connecticut Original No. 2,420,978, dated May 20, 1947, Serial No. 695,610, September 9, 1946. Application for reissue July 16, 1947, Serial No. 761,363

13 Claims. (Cl. 139—384)

This invention relates to improvements in ladder-tapes, which are primarily employed for supporting the slats of so-called "Venetian blinds" and the like, and which comprise a pair of spaced-apart front and back main tapes between which extends transverse textile material constituting the rungs or ladders.

One object of this invention is to provide an improved ladder-tape which can have the opposite outside faces of the main tapes woven of strands of different colors, and can have the ladder-warp strands which are in the ladders, interwoven with weft strands of the main tapes in such manner as to be concealed from the opposite outside faces of the main tapes, thus permitting the ladder-warps to be of any desired color or colors, since they will be concealed entirely from the opposite outside faces of the main tapes.

Another object of this invention is to provide an improved ladder-tape which can have the ladder-warps of the ladders interwoven with the main tapes without producing any substantial change in the weave-appearance at the opposite outside faces of main tapes.

Another object of this invention is to provide an improved ladder-tape in which the ladder-warp strands are interwoven with the main tapes, as hereinbefore explained, and which ladder-warp strands are all effectively and securely anchored to the weft strands of the main tapes.

With the above and other objects in view, as will appear to those skilled in the art from the present disclosure, this invention includes all features in the said disclosure which are novel over the prior art.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Figure 1:
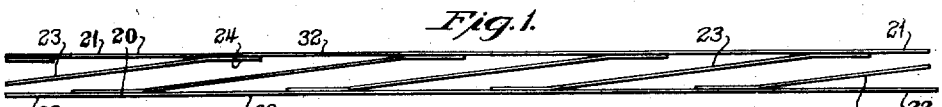
Fig. 1 is an edge view of a fragment of ladder-tape made in accordance with the present invention.
Figure 2:
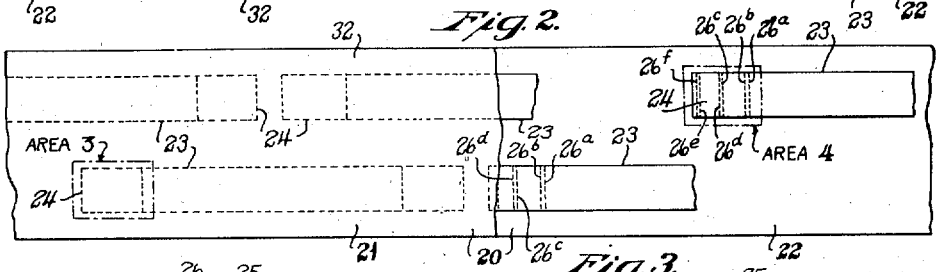
Fig. 2 is a top plan view with part broken away, of Fig. 1.

Referring to Figs. 1 to 7 of the drawings showing the particular form of the invention chosen for illustration therein, the ladder-tape 20 includes two main- or body-tapes 21 and 22 connected together by ladders or rungs 23. One of the main tapes such, for example, as 21 may be referred to as the "front or face" main tape and the other main tape 22 may be referred to as the "back or rear" main tape. Each ladder 23 interconnects the main tapes 21 and 22 by being connected to the main tapes at what may be referred to as areas-of-junction 24.

Each of the main tapes 21 and 22 is formed by having warp strands 25 extending throughout the length of the main tapes, and interwoven with picks of a weft strand 26. The particular form of weave employed in the construction illustrated in Figs. 1 to 7, is what may be referred to as a herringbone-twill or chevron-twill or pointed twill-weave. Each warp strand 25 is a single end or strand or thread and is woven with its warp-floats each extending over two and under two weft-picks of weft strand 26. It will be seen that each two adjacent warp-floats are in side-by-side contact with one another at each common weft-pick of the weft strand 26 over which they both extend.

Each ladder 23 is formed of two groups of sets 28 and 29 of warp strands which are interwoven with a ladder weft strand 30. The group of sets 28 is alternate with the group of sets 29. Each set 28 consists of ladder-warp strands or ends or threads 28a and 28b, and each set 29 consists of ladder-warp strands or ends or threads 29a and 29b. The sets 28 are looped over one weft-pick 26a of each main tape 21 and 22, and the other alternate sets 29 are looped over the third-away weft-pick 26*b* of the main tapes. Then all of the sets 28 and 29 of the ladder-warp strands are interwoven with four weft-picks 30*a* of the ladder-weft strand 30. Then the sets 28 and 29 are again respectively looped over two third-away-from-each-other weft-picks 26*c* and 26*d* of the main tapes, and then are again interwoven with four weft-picks 30*b* of the ladder-weft strand 30, and then again are respectively looped over two third-away-from-each-other weft-picks 26*e* and 26*f* of the main tapes, in each area-of-junction 24 of each ladder and main tape. It will thus be seen that the ladder-warps are all looped over three groups of two main-tape weft-picks at three spaced-apart locations longitudinally of the main tapes, and that the ladder-warps are also interwoven with two groups of four weft-picks at each of two spaced-apart interwoven-ladder-warp-and-ladder-weft locations.

It will be seen that where each set 28 (or 29) of ladder-warps 28*a* and 28*b* (or 29*a* and 29*b*) is looped over one of the weft-picks 26*a* to 26*f* inclusive, of a main tape, that it is located between the common weft-pick 26*a* (or one of picks 26*b* to *f*) and the space occupied by the said side-by-side-in-contact portions of the warp-floats of the main tapes, thus concealing the sets 28 and 29 of warp strands from the outer face 32 of each main tape. By having each set 28 and 29 of ladder-warps formed of two or more side-by-side warp strands, it will be observed that as they are interwoven with the main-tape weft-picks and the ladder-weft-picks that the warps of each pair are pressed sidewise together toward one another in a constricted manner to thus aid in locking the warp strands of a set from being pulled out of their anchored-in areas-of-junction 24 with the main tapes 21 and 22. By referring to Figs. 5 and 7, it will be seen that each of certain sets of ladder-warps is concealed beneath two warp-floats in some locations, and beneath three warp-floats at other locations. While the ladder-warp strands 28*a*, 28*b*, 29*a* and 29*b* are illustrated as being substantially smaller in diameter than the main-tape warp strands 25, they could be made as large as the main-tape warp strands.

Figure 8:
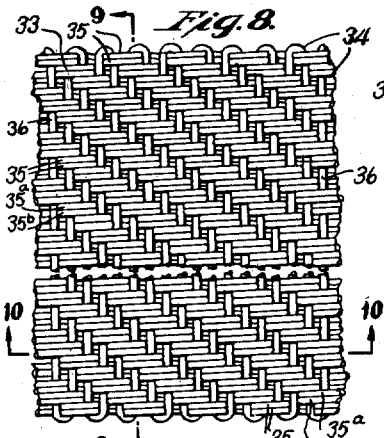
Fig. 8 is a view similar to Fig. 3, of a modified weave-construction.
Figure 9:
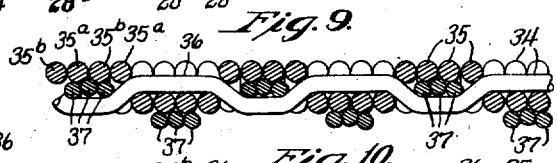
Fig. 9 is a sectional view on line 9—9 of Fig. 8.
Figure 10:
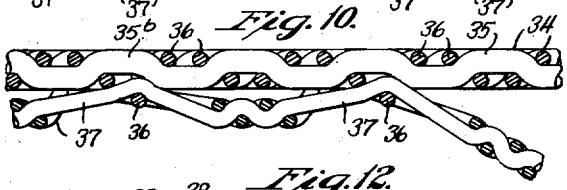
Fig. 10 is a sectional view on line 10—10 of Fig. 8.

In the form of the invention illustrated in Figs. 8, 9 and 10, an over-two-and-under-two plain twill-weave 33 of a main tape 34 is illustrated as being formed by sets 35 of warps being interwoven with weft-picks 36. Each set 35 is composed of two side-by-side-in-contact warp strands 35*a* and 35*b* which provide four warp-floats in side-by-side-contact relation at each common weft-pick 36. Three ladder-warp strands 37 are illustrated as being looped over each common weft-pick 36 and located between the common weft-pick and the space occupied by the four main-tape warp-strands 35*a* and 35*b*, although a greater or lesser number of ladder-warps could be so employed.

Figure 12:
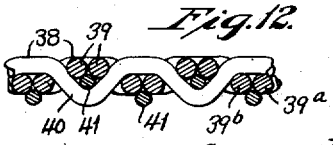
Fig. 12 is a sectional view on line 12—12 of Fig. 11.
Figure 11:
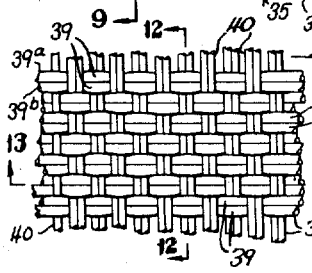
Fig. 11 is a view similar to Fig. 8, of another modified form of weave-construction.
Figure 13:
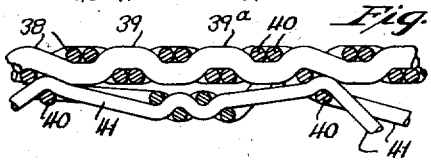
Fig. 13 is a sectional view on line 13—13 of Fig. 11.

In the form of the invention illustrated in Figs. 11, 12 and 13, a main tape 38 is illustrated as formed by sets 39 of warp strands 39*a* and 39*b* interwoven with weft-picks 40 in the form of an over-two-and-under-two basket-weave. In this form of the invention, the ladder-warps 41 are illustrated as being single ends or strands looped over weft-picks 40 so as to be located between the common weft-picks 40 and the sets or pairs 39 of main-tape warp strands 39*a* and 39*b*.

Figure 14:
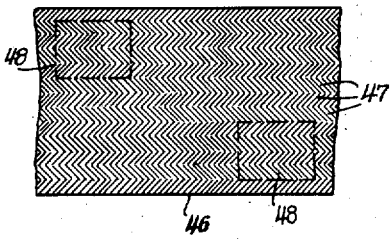
Fig. 14 is a view similar to Fig. 11, of another modified form of weave-construction.

In the form of the invention illustrated in Fig. 14, a main tape 46 is illustrated as formed of a fine chevron-twill weave 47, in which each area-of-junction portion 48 of the main tape is of two-chevron width.

Figure 3:
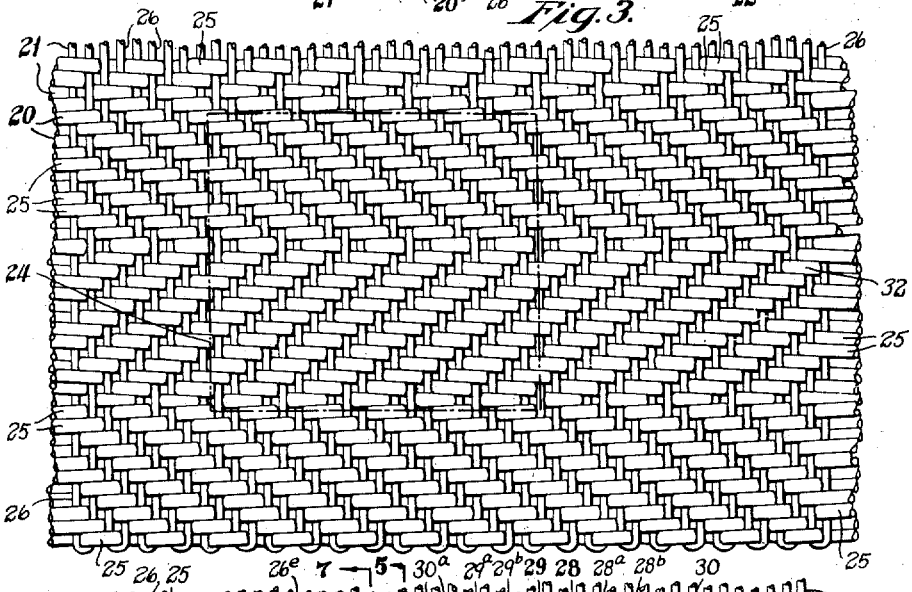
Fig. 3 is an enlarged view of area 3 of Fig. 2.
Figure 15:
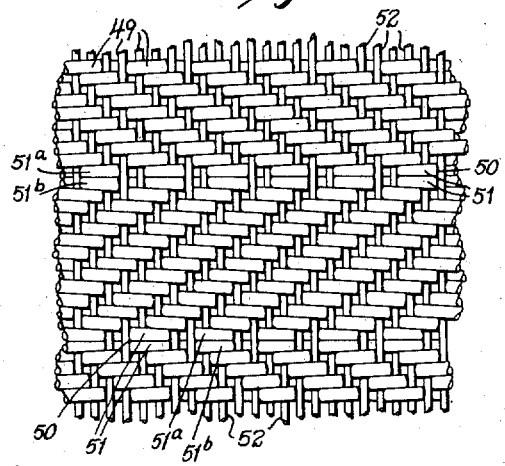
Fig. 15 is a view similar to Fig. 3, of another modified form of weave-construction.

In the form of the invention illustrated in Fig. 15, each main tape 49 is formed of a herringbone or chevron-twill weave similar to that of Fig. 3 except that the point 50 of each chevron is formed of a pair or set 51 of warp strands 51*a* and 51*b*, so that a ladder-warp can be looped over a weft-pick 52 beneath the strands 51*a* and 51*b* to provide concealment.

Figure 4:
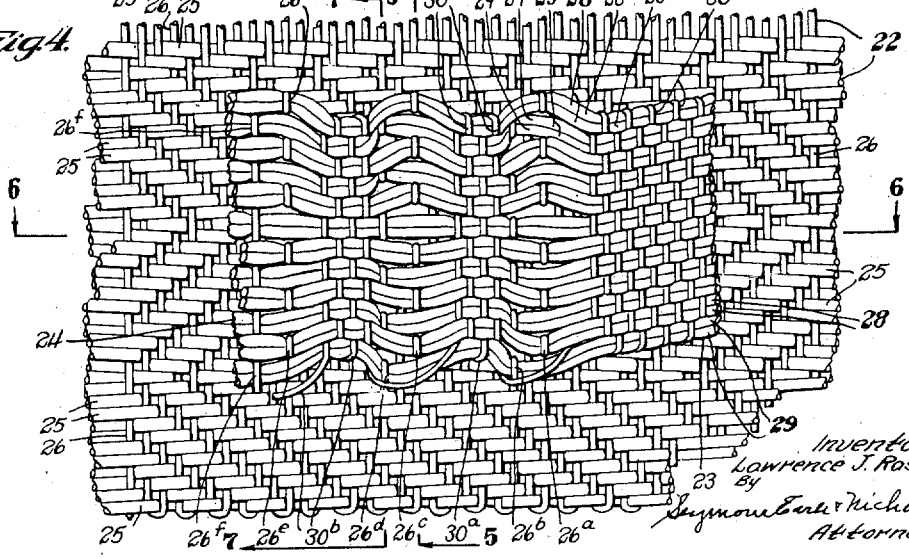
Fig. 4 is an enlarged view of area 4 of Fig. 2.
Figure 5:
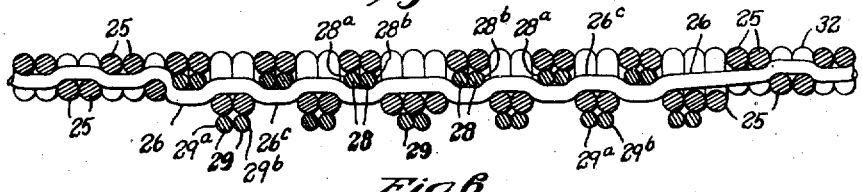
Fig. 5 is a sectional view on line 5—5 of Fig. 4.
Figure 6:
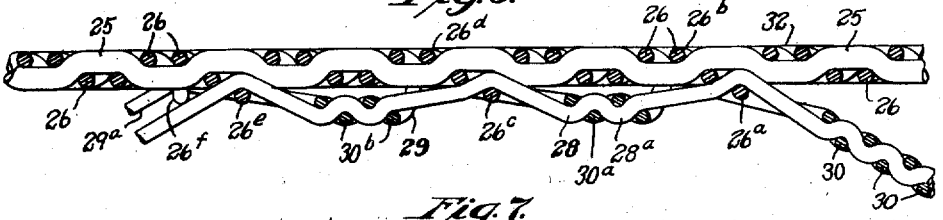
Fig. 6 is a sectional view on line 6—6 of Fig. 4.
Figure 7:
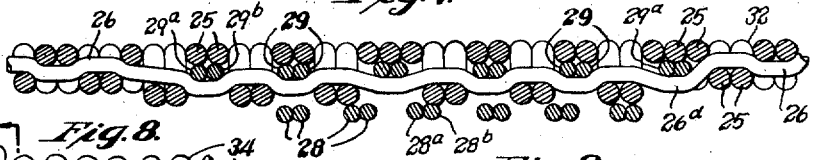
Fig. 7 is a sectional view on line 7—7 of Fig. 4.
Figure 16:
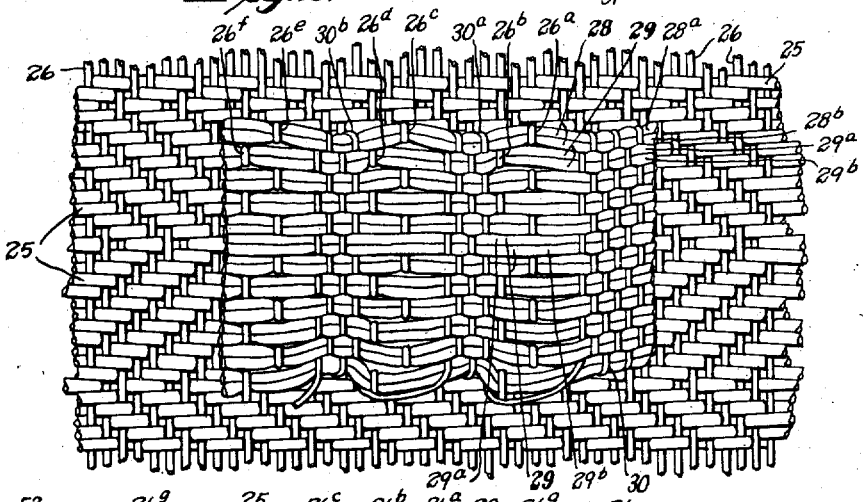
Fig. 16 is a view similar to Fig. 4, of another modified construction.

In the form of the invention illustrated in Fig. 16, the construction is generally the same as in Fig. 4 except that one intermediate set 29 of ladder-warp strands 29*a* and 29*b* are not woven in with main-tape weft-picks, but are floated along with the adjacent ladder-warp strands. This construction permits of weaving in sufficient ladder-warp strands with main-tape weft-picks for ample strength of connection with a main tape.

Figure 17:
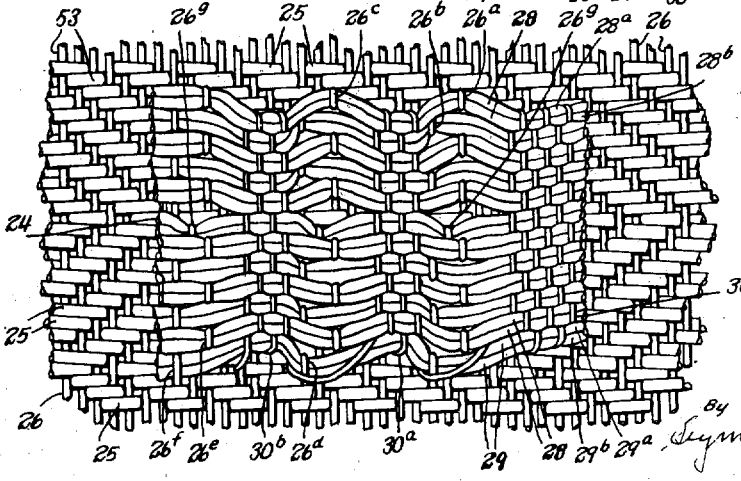
Fig. 17 is a view similar to Fig. 4, of another modified construction.

In the form of the invention illustrated in Fig. 17, a main tape 53 is illustrated as having the alternate sets 28 and 29 (similar to Fig. 4) of ladder-warp strands 28*a*, 28*b*, 29*a* and 29*b* looped over three adjacent picks 26*a*, 26*g* and 26*b*, at each weave-in location, instead of over only two third-away picks 26*a* and 26*b* as in Fig. 4, thus permitting of looping-over or weaving-in more ladder-warps in a given width.

In the claims, expressions such as "groups of warp-floats" are referred to as floating over a common weft-pick in side-by-side contact with one another at such common weft-picks. This term "group" is intended to include two distinct warp strands such as the warp strands 25 which are singles as illustrated in Fig. 3, as they float over a common weft-pick, or to include all or part of two or more sets of warp-floats which float over a common weft-pick as in the form of the invention illustrated in Figs. 8, 9 and 10 where a group of such warp-floats may include all or part of two sets of warp strands, each set including two or more warp strands. An expression such as "the point of a chevron-rib" is intended to mean the point of an individual rib which is formed by two angularly-arranged rib-legs. An expression such as "looped-over" a weft-pick is intended to mean the same as "looped about" a weft-pick, and not to have any significance as to whether it is above or below the weft-pick.

While the ladder-warp strands could be employed without any weft, it is preferred to interweave them with a weft, as hereinbefore described.

For effective concealment of a ladder-warp of different color from the color of the outer face of the main tape, where it is interwoven with such a main tape, it is important that such ladder-warp be looped over only a single main-tape weft-pick at any given location.

By having the ladder-warps looped over weft-picks in sets, each set consisting of two or more strands, more ladder-warps can be woven into a given width for a given number of woven-in or looped-over locations, and the ladder-warps can be more firmly secured to the main tapes.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A ladder-tape including: two main tapes, and ladders interconnecting said main tapes at areas-of-junction with said main tapes; each main tape being mainly formed by warp strands interwoven with weft-picks by a weave in which warp-floats of each group of a plurality of groups of warp-floats at a plurality of locations longitudinally and transversely of each main tape, float over a plurality of weft-picks, at least one of which is a common weft-pick, in side-by-side contact with one another at a said common weft-pick; and each ladder having ladder warp strands, each of a plurality of said ladder warp strands being looped over only one weft-pick of any said plurality of weft-picks, and which looped-over one weft-pick is a common weft-pick, and between said common weft-pick and the space occupied by said side-by-side-in-contact warp-floats of a said group of warp-floats, at a said common weft-pick, at a plurality of locations in each said area-of-junction, longitudinally of the main tapes.

2. A ladder-tape including: two main tapes, and ladders interconnecting said main tapes at areas-of-junction with said main tapes; each main tape being mainly formed by warp strands interwoven with weft-picks by a weave in which each area-of-junction portion of the main tapes is a twill-weave in which warp-floats of each group of a plurality of groups of warp-floats at a plurality of locations longitudinally and transversely of each main tape, float over a common weft-pick in side-by-side contact with one another at said common weft-pick; and each ladder having ladder warp strands, each of a plurality of said ladder warp strands being looped over a said common weft-pick and between said common weft-pick and the space occupied by said side-by-side-in-contact warp-floats of a said group of warp floats, at a said common weft-pick, at a plurality of locations in each said area-of-junction, longitudinally of the main tapes.

3. A ladder-tape including: two main tapes, and ladders interconnecting said main tapes at areas-of-junction with said main tapes; each main tape being mainly formed by warp strands interwoven with weft-picks by a weave in which each area-of-junction portion of the main tapes is a twill weave in which warp-floats of each group of a plurality of groups of warp-floats at a plurality of locations longitudinally and transversely of each main tape, float over a plurality of weft-picks, at least one of which is a common weft-pick, in side-by-side contact with one another at a said common weft-pick; and each ladder having ladder-warp strands, each of a plurality of said ladder-warp strands being looped over only one weft-pick of any said plurality of floated-over weft-picks, and which looped-over one weft-pick is a common weft-pick, and between said common weft-pick and the space occupied by said side-by-side-in-contact warp-floats of a said group of warp-floats, at a said common weft-pick, at a plurality of locations in each said area-of-junction, longitudinally of the main tapes.

4. A ladder-tape including: two main tapes, and ladders interconnecting said main tapes at areas-of-junction with said main tapes; each main tape being mainly formed by sets of warp strands interwoven with weft-picks by a weave in which warp-floats of each group of a plurality of groups of warp-floats at a plurality of locations longitudinally and transversely of each main tape, float over a plurality of weft-picks, at least one of which is a common weft-pick, in side-by-side contact with one another at a said common weft-pick; and each ladder having ladder warp strands, each of a plurality of said ladder warp strands being looped over only one weft-pick of any said plurality of weft-picks, and which looped-over one weft-pick is a common weft-pick, and between a said looped-over common weft-pick and the space occupied by said side-by-side-in-contact warp-floats of a said group of warp-floats, at a said common weft-pick, at a plurality of locations in each said area-of-junction, longitudinally of the main tapes.

5. A ladder-tape including: two main tapes, and ladders interconnecting said main tapes at areas-of-junction with said main tapes; each main tape being mainly formed by warp strands interwoven with weft-picks by a weave in which each area-of-junction portion of the main tapes has sets of warps and in which warp-floats of each of a plurality of said sets of warp-floats at a plurality of locations longitudinally and transversely of each main tape, float over a plurality of common weft-picks, in side-by-side contact with one another at a said plurality of floated-over common weft-picks; and each ladder having ladder warp strands, each of a plurality of said ladder warp strands being looped over only one weft-pick of any said plurality of floated-over common weft-picks, and between a said looped-over common weft-pick and the space occupied by said side-by-side-in-contact warp-floats of a said set of warp-floats, at a said common weft-pick, at a plurality of locations in each said area-of-junction, longitudinally of the main tapes.

6. A ladder-tape including: two main tapes, and ladders interconnecting said main tapes at areas-of-junction with said main tapes; each main tape being mainly formed by warp strands interwoven with weft-picks by a weave in which warp-floats of each group of a plurality of groups of warp-floats at a plurality of locations longitudinally and transversely of each main tape, float over a plurality of weft-picks, at least one of which is a common weft-pick, in side-by-side contact with one another at a said common weft-pick; and each ladder having sets of ladder warp strands, each set of a plurality of said sets of ladder warp strands being looped over only one weft-pick of any said plurality of weft-picks, and which looped-over one weft-pick is a common weft-pick, and between a said looped-over common weft-pick and the space occupied by said side-by-side-in-contact warp-floats of a said group of warp-floats, at a said common weft-pick, at a plurality of locations in each said area-of-junction, longitudinally of the main tapes.

7. A ladder-tape including: two main tapes, and ladders interconnecting said main tapes at areas-of-junction with said main tapes; each main tape being mainly formed by warp strands interwoven with weft-picks by a weave in which warp-floats of each group of a plurality of groups of warp-floats at a plurality of locations longitudinally and transversely of each main tape, float over a plurality of weft-picks, at least one of which is a common weft-pick, in side-by-side contact with one another at a said common weft-pick; and each ladder having sets of ladder warp strands, each set of a plurality of said sets of ladder warp strands being looped over only one weft-pick of any said plurality of weft-picks, and which looped-over one weft-pick is a common weft-pick, and between a said looped-over common weft-pick and the space occupied by said side-by-side-in-contact warp-floats of a said group of warp-floats, at a said common weft-pick, at a plurality of spaced-apart locations in each said area-of-junction, longitudinally of the main tapes, and the ladder warp strands being interwoven with a plurality of ladder weft-picks between each two adjacent locations of said spaced-apart locations.

8. A ladder-tape including: two main tapes, and ladders interconnecting said main tapes at areas-of-junction with said main tapes; each main tape being mainly formed by warp strands interwoven with weft-picks by a weave in which each area-of-junction portion of the main tapes is a twill-weave in which warp-floats of each group of a plurality of groups of warp-floats at a plurality of locations longitudinally and transversely of each main tape, float over a common weft-pick in side-by-side contact with one another at said common weft-pick; and each ladder having sets of ladder warp strands, each set of a plurality of said sets of ladder warp strands being looped over a said common weft-pick and between said common weft-pick and the space occupied by said side-by-side-in-contact warp-floats of a said group of warp-floats, at a said common weft-pick, at a plurality of spaced-apart locations in each said area-of-junction, longitudinally of the main tapes, and the ladder warp strands being interwoven with a plurality of ladder weft-picks between each two adjacent locations of said spaced-apart locations.

9. A ladder-tape including: two main tapes, and ladders interconnecting said main tapes at areas-of-junction with said main tapes; each main tape being mainly formed by warp strands interwoven with weft-picks by a weave in which each area-of-junction portion of the main tapes is a one-chevron twill-weave in which warp-floats of each group of a plurality of groups of warp-floats at a plurality of locations longitudinally and transversely of each main tape, float over a common weft-pick in side-by-side contact with one another at said common weft-pick; and each ladder having ladder warp strands, each of a plurality of said ladder warp strands being looped over a said common weft-pick and between said common weft-pick and the space occupied by said side-by-side-in-contact warp-floats of a said group of warp-floats, at a said common weft-pick, at a plurality of locations in each said area-of-junction, longitudinally of the main tapes.

10. A ladder-tape including: two main tapes, and ladders interconnecting said main tapes at areas-of-junction with said main tapes; each main tape being mainly formed by warp strands interwoven with weft-picks by a weave in which each area-of-junction portion of the main tapes is a plural-chevron twill-weave in which warp-floats of each group of a plurality of groups of warp-floats at a plurality of locations longitudinally and transversely of each main tape, float over a common weft-pick in side-by-side contact with one another at said common weft-pick; and each ladder having ladder warp strands, each of a plurality of said ladder warp strands being looped over a said common weft-pick and between said common weft-pick and the space occupied by said side-by-side-in-contact warp-floats of a said group of warp-floats, at a said common weft-pick, at a plurality of locations in each said area-of-junction, longitudinally of the main tapes.

11. A ladder-tape including: two main tapes, and ladders interconnecting said main tapes at areas-of-junction with said main tapes; each main tape being mainly formed by warp strands interwoven with weft-picks by a weave in which each area-of-junction portion of the main tapes is a chevron-type twill-weave in which each of the points of the chevron-ribs in each area-of-junction portion is formed by a set of warp strands, and in which warp-floats of each group of a plurality of groups of warp-floats at a plurality of locations longitudinally and transversely of each main tape, float over a common weft-pick in side-by-side contact with one another at said common weft-pick; and each ladder having ladder warp strands, each of a plurality of said ladder warp strands being looped over a said common weft-pick and between said common weft-pick and the space occupied by said side-by-side-in-contact warp-floats of a said group of warp-floats, at a said common weft-pick, at a plurality of locations in each said area-of-junction, longitudinally of the main tapes.

12. A ladder-tape including: two main tapes, and ladders interconnecting said main tapes at areas-of-junction with said main tapes; each main tape being mainly formed by warp strands interwoven with weft-picks by a weave in which each area-of-junction portion of the main tapes is a one-chevron twill-weave in which the points of the chevron-ribs in each area-of-junction portion lie along a line in substantial alignment with the longitudinal center-line of the ladder at each area-of-junction, and in which warp-floats of each group of a plurality of groups of warp-floats at a plurality of locations longitudinally and transversely of each main tape, float over a common weft-pick in side-by-side contact with one another at said common weft-pick; and each ladder having ladder warp strands, each of a plurality of said ladder warp strands being looped over a said common weft-pick and between said common weft-pick and the space occupied by said side-by-side-in-contact warp-floats of a said group of warp-floats, at a said common weft-pick, at a plurality of locations in each said area-of-junction, longitudinally of the main tapes, at least one ladder-warp along said center-line being floated along over said points without being looped over main-tape weft-picks.

13. A ladder-tape including: two main tapes, and ladders interconnecting said main tapes at areas-of-junction with said main tapes; each main tape being mainly formed by warp strands interwoven with weft-picks by a weave in which each area-of-junction portion of the main tapes is a one-chevron twill-weave in which warp-floats of each group of a plurality of groups of warp-floats at a plurality of locations longitudinally and transversely of each main tape, float over a common weft-pick in side-by-side contact with one another at said common weft-pick; and each ladder having ladder warp strands, each of a plurality of said ladder warp strands being looped over a said common weft-pick and between said common weft-pick and the space occupied by said side-by-side-in-contact warp-floats of a said group of warp-floats, at a said common weft-pick, at three near-together main-tape weft-pick locations.

LAWRENCE J. RASERO.